(12) United States Patent
Torline

(10) Patent No.: US 9,653,098 B2
(45) Date of Patent: May 16, 2017

(54) TAPE HEAD MODULES FOR PERFORMING AZIMUTH RECORDING AND READING OF TAPE MEDIA USING A LINEAR FORMAT

(71) Applicant: Oracle International Corporation, Redwood City, CA (US)

(72) Inventor: Joseph E. Torline, Arvada, CO (US)

(73) Assignee: Oracle International Corporation, Redwood City, CA (US)

( * ) Notice: Subject to any disclaimer, the term of this patent is extended or adjusted under 35 U.S.C. 154(b) by 503 days.

(21) Appl. No.: 14/157,014

(22) Filed: Jan. 16, 2014

(65) Prior Publication Data

US 2015/0199981 A1    Jul. 16, 2015

(51) Int. Cl.
*G11B 5/008*    (2006.01)
*G11B 5/48*    (2006.01)

(52) U.S. Cl.
CPC ........ *G11B 5/00826* (2013.01); *G11B 5/4893* (2013.01); *Y10T 29/49032* (2015.01)

(58) Field of Classification Search
None
See application file for complete search history.

(56) References Cited

U.S. PATENT DOCUMENTS

| | | | | |
|---|---|---|---|---|
| 6,744,594 B2* | 6/2004 | Denison et al. | ............. | 360/121 |
| 7,239,465 B1* | 7/2007 | Watson et al. | ................. | 360/55 |
| 8,144,424 B2* | 3/2012 | Dugas et al. | ................ | 360/121 |

* cited by examiner

*Primary Examiner* — K. Wong
(74) *Attorney, Agent, or Firm* — Marsh Fischmann & Breyfogle LLP; Jonathon A. Szumny

(57) ABSTRACT

A tape head module for performing azimuth recording and reading of tape media (e.g., where data bands are disposed at an angle to the direction of media travel) to increase the storage density of tape media. An array of read and/or write elements of the tape head module is oriented along an axis different than those of first and second lateral (e.g., overwrapped) edges of the tape head module. Positioning the first and second lateral edges of the disclosed tape head module to be perpendicular to the direction of tape motion (e.g., so that the tape moves over the first and second lateral edges perpendicularly to the first and second lateral edges) automatically positions the array of read and/or write elements at an azimuth angle (e.g., non-perpendicular angle) to the direction of tape motion. Also disclosed are methods for fabricating such tape head modules and related tape head assemblies.

20 Claims, 15 Drawing Sheets

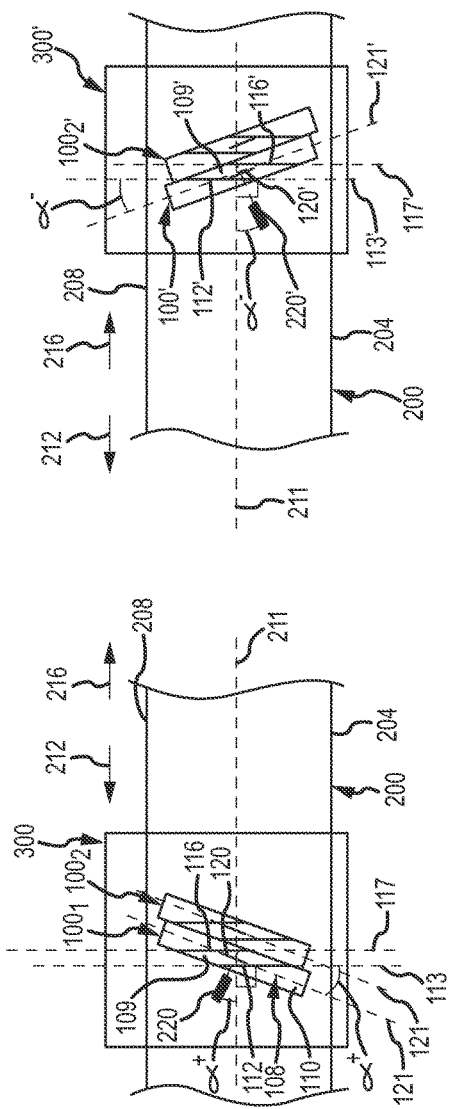

TAPE HEAD MODULES FOR PERFORMING AZIMUTH RECORDING AND READING OF TAPE MEDIA USING A LINEAR FORMAT

BACKGROUND

1. Field of the Invention

The present invention generally relates to the storing of data on magnetic tape media and, more particularly, to tape heads for writing data to and reading data from magnetic tape media using a linear format.

2. Relevant Background

The market for mass storage devices is growing at an ever increasing rate with the sales of high-performance computers penetrating numerous industries ranging from financial institutions to oil exploration companies. The processing power of these high-performance systems, and the data they generate, are increasing faster than the ability of storage devices to keep pace. The problem of data storage and rapid retrieval is particularly pronounced in computational-intensive applications which create huge amounts of data that need to be accessed in seconds rather than minutes, hours or even days.

Magnetic disks remain the preferred media for direct access to frequently used files because of their fast access times. However, because of their high cost per-unit of storage and limited capacity, magnetic disk recorders are prohibitively expensive and therefore impractical for large-scale data storage. With the advances in magnetic tape technology, tape based systems remain the preferred choice for mass data storage. In addition to cost, magnetic tape exceeds the storage density of almost any other medium, at least from a volumetric standpoint, because tape is a much thinner medium than, for example, magnetic disks, and tape can be tightly packed.

Magnetic tape (e.g., recording tape) is a magnetic recording medium made of a thin magnetizable coating on a long, narrow strip of plastic which is typically stored in the form of a spool on a cartridge or cassette. The tape media contacts the surface of a linear recording head (e.g., tape head, tape head module, etc.) of a tape drive as the tape is transported from one reel to another. During write operations, a write transducer (e.g., write element) converts electronic pulses to magnetic signals that record a band (or track) of data onto the media as it travels across the head surface. The orientation of the write transducer (e.g., the longitudinal axis of the write transducer) is such that it is perpendicular to the travel of the media and the resultant magnetic transitions are thus written parallel to the travel of the media.

To enhance the data transfer rate of the tape drive, the linear recording head typically utilizes an array (e.g., set, span) of write transducers (e.g., 16 devices, 32 devices, etc.) that simultaneously record/write data to the media. The array of write transducers is oriented perpendicular to the direction of motion of the media (e.g., the travel of the media). When the entire length of recording tape has been run over the head (usually several hundreds of meters or more), the position of the head is shifted slightly relative to the media (e.g., laterally relative to a width of the media), the direction of the tape transport motion is reversed, and a new set of data bands are recorded onto the media adjacent to the ones previously written. This process is repeated multiple times resulting in numerous data tracks being written to the tape media. In the case of an approximately 12.5 mm wide recording tape, for instance, hundreds or thousands of data tracks may be recorded across the width of the tape.

When the data is read back from the media, read transducers located on the recording head are used to detect the magnetic transitions written to the tape and convert them to electronic signals. For linear recording, the width of the read transducer is typically smaller than the width of the written data track; doing so creates a "guard band" that allows for some positioning error between the centerline of the read transducer and the centerline of the written track of interest to occur without having any region of the read transducer go outside of the written data band. The positioning error is caused by system variations (e.g., servo positioning error, tape guiding error, manufacturing variations, temperature and humidity effects on the media and drive components, etc.) that are minimized but typically cannot be completely eliminated. Like the write transducers, each read transducer (e.g., its longitudinal axis) is oriented perpendicular to the direction of travel of the tape media as well as perpendicular to the data band being read.

For instance, FIG. 1 is a close-up simplified schematic plan view of a read transducer 708 reading data tracks 704 from a magnetic tape 700 according to a conventional design. Each data track 704 is written parallel to one of first and second opposite directions of motion 702, 703 of the magnetic tape 700. Accordingly, a longitudinal axis 712 of the read transducer 708 is oriented perpendicularly to the first and second opposite directions 702, 703 of motion of the magnetic tape 700 as well as perpendicularly to a particular data track 704 so the read transducer 708 can read the data track 704. The width of the read transducer 708 (i.e., the length of the read transducer 708 along the longitudinal axis 712) is smaller than the width of each written track 704.

In the event that a region of the read transducer 708 goes outside of the targeted written track 704, the read transducer 708 will read signal from the neighboring written track 704 as noise. As the read transducer 708 goes further off track, the amount of desirable signal decreases and the amount of noise signal increases, causing the signal to noise ratio to decrease dramatically. However, as the width of the read transducer 708 gets smaller (e.g., with reduced track widths), the amplitude of the detected signal also gets smaller. As there exists a certain level of inherent system (electronic) and media noise, decreasing the width of the read transducer 708 thus causes the signal to noise ratio to decrease as well. However, a robust data storage system requires a large signal to noise ratio. The design of the read transducer 708 for conventional linear tape storage systems therefore involves a balance between making the width of the read transducer 708 as large as possible to maximize the detected signal while keeping it small enough to provide an adequate positioning error guard band.

With each new generation of tape storage device, it is desirable to increase the amount of data that is stored on a cartridge of magnetic tape. One way of achieving increased data storage is to increase the number of data tracks that are written on the tape which necessitates making each written track width smaller and thus reducing the width of the read transducer. In this regard, striking a balance between read transducer amplitude and positioning error guard band becomes more difficult to achieve with each successive generation of tape data storage system.

One manner of increasing the signal to noise ratio is by dispensing with the guard band between the width of the written track and the read transducers altogether, such as through the use of "azimuth" recording in which bands of data are written at a slight angle (e.g., azimuth) to parallel (to the direction of media travel). Adjacent tracks are written with an azimuth angle of opposite sign (i.e., one track is written with a positive azimuth, the next with a negative azimuth, the next with a positive azimuth, etc.). A read transducer with the same azimuth angle as the written data can read the intended data without problem.

For instance, FIG. 2 is close-up, simplified schematic plan view of a read transducer 808 reading data tracks 804 from a magnetic tape 800 according to another conventional design. The data in each data track 804 (where the data is represented by the arrows in the data tracks 804 in FIG. 2) is written at an azimuth angle α to one of first and second opposite directions of motion 802, 803 of the magnetic tape 800. As shown, the read transducer 808 (its longitudinal axis 812) is oriented at the azimuth angle α relative to the perpendicular to the direction of motion of the magnetic tape so that the longitudinal axis 812 of the read transducer 808 is oriented perpendicularly to the data of the data bands 804 being read. If the read transducer 808 goes off track to an adjacent track 804 written with the opposite azimuth angle α, destructive interference is created that effectively cancels any corresponding noise. Hence, the width of the read transducer 808 (i.e., the length of the read transducer 808 along its longitudinal axis 812) can be as large as the written data track (or even larger as shown in FIG. 2) free of incurring any signal to noise degradation.

SUMMARY

While azimuth recording has been used in the context of, for instance, video tape recorders to achieve increased storage densities for some time, such devices typically only include one or two read/write transducers actively engaged with the media at any time which is too slow for magnetic tape data storage applications. In this regard, a multi-channel recording head that utilizes azimuth recording and is applicable to linear tape data storage environments is needed. One possibility for making a linear azimuth tape head might be to mechanically mount a standard linear tape head(s) (e.g., where first and second lateral edges of the tape head and the array of read and/or write elements are oriented in a common direction or, in other words, are parallel) in the tape path so that it is at an azimuth angle from being perpendicular to the travel of the media (e.g., such that the first and second lateral edges of the tape head and the array of read and/or write elements are oriented at same azimuth angle). However, the above arrangement may result in force moments on the media traveling over the tape head (e.g., due to uneven frictional forces caused by the engagement of the media with the recording head surface that occur when the head contour is not perpendicular to the motion of the tape) that may result in cross-width tension differences that make guiding the tape unwieldy and result in a considerable degradation of the servo following capabilities.

In view of at least the foregoing, the inventor has determined that a tape head module is needed that can perform azimuth recording of tape media in a manner that is substantially free of force moments on the tape media and the resultant difficulties with guiding the tape media and servo following capabilities. In this regard, disclosed herein is a tape head module of a tape head in which an array of read and/or write elements in or on the tape head module are oriented in a direction that is different than that of first and second lateral (e.g., overwrapped) edges of the tape head module over which the tape passes perpendicularly. More particularly, positioning the first and second lateral edges of the disclosed tape head module so that they are perpendicular to the direction of tape motion (e.g., so that the tape moves over the first and second lateral edges perpendicularly to the first and second lateral edges) automatically positions the array of read and/or write elements of the disclosed tape head module at an azimuth angle (e.g., non-perpendicular angle) to the direction of tape motion. The disclosed tape head module can perform azimuth recording (and reading) of data on tape media to achieve increased signal to noise ratios in a manner that is substantially free of causing force moments on the tape media and the resultant difficulties with guiding the tape media and servo following capabilities.

In one aspect, an apparatus (e.g., tape head module) for performing at least one of reading operations and writing operations on a magnetic tape is disclosed. The apparatus includes a body, an upper surface on the body that is configured to face a magnetic tape traveling at least partially over the upper surface, and first and second opposite edges that border the upper surface over which the magnetic tape is configured to pass. The upper surface includes a plurality (e.g., span, set) of at least one of read elements and write elements (e.g. transducers) that are respectively configured to read data from and write data to the magnetic tape as the magnetic tape travels over and at least partially in contact with the upper surface, where the plurality of the at least one of read elements and write elements extend along a reference axis. The first and second opposite edges respectively extend along first and second axes, where the first axis is parallel to the second axis, where the first axis is non-parallel and non-perpendicular to the reference axis, and where the second axis is non-parallel and non-perpendicular to the reference axis.

In one arrangement, a system (e.g., tape head, tape head assembly, etc.) includes a frame, a first of the disclosed apparatuses secured relative to the frame, and a second of the disclosed apparatuses secured relative to the frame. For instance, the reference axis of the first apparatus may be parallel or non parallel to the reference axis of the second apparatus. The system may be appropriately disclosed in a tape drive so that the plurality of read/write elements of the first and second apparatuses are disposed at a non-perpendicular angle to the direction of motion of tape media traveling thereover.

In another aspect, a method of operating a tape drive includes moving tape along a direction of motion over first and second opposite edges of a tape head module of a tape drive, where the first and second opposite edges extend perpendicular to the direction of motion; contacting, during the moving step, an upper surface of the tape head module with the tape, where the upper surface is disposed between the first and second opposite edges; and performing, during the contacting step, at least one of reading and writing of data on the tape with a span of transducers disposed on the upper surface, where the span of transducers extends non-perpendicular to the direction of motion.

For instance, the tape head module may be a first tape head module, and the method may further include moving the tape along the direction of motion over first and second opposite edges of a second tape head module of the tape drive, where the first and second opposite edges of the second tape head module extend perpendicular to the direction of motion; contacting, during the step of moving the tape over the first and second opposite edges of the second tape head module, the upper surface of the second tape head module with the tape, where the upper surface of the second tape head module is disposed between the first and second opposite edges of the second tape head module; and performing, during the step of contacting the upper surface of the second tape head module with the tape, at least one of reading and writing of data on the tape with a span of transducers disposed on the upper surface of the second tape head module, where the span of transducers extends non-perpendicular to the direction of motion.

In a further aspect, a method of fabricating tape head modules includes providing a wafer module that includes a top surface with a plurality of arrays of transducers extending along a reference axis; removing material from the top surface to create a plurality of channels in the top surface that extend at a non-parallel and non-perpendicular angle to the reference axis; and slicing the wafer along a plurality of first axes, where each first axis of the plurality of first axes is perpendicular to the reference axis, where each first axis of the plurality of first axes is disposed between adjacent arrays of transducers of the plurality of arrays of transducers, and where a plurality of tape head modules are formed after the removing and slicing steps.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

BRIEF DESCRIPTION OF THE DRAWINGS

FIG. 5a is a close-up, simplified schematic plan view of a tape head assembly performing azimuth writing and/or reading of data of a magnetic tape traveling thereover, according to one embodiment.

FIG. 5b is a close-up, simplified schematic plan view of a tape head assembly performing azimuth writing and/or reading of data of a magnetic tape traveling thereover, according to another embodiment.

FIG. 6b illustrates an individual chip cut from the wafer of FIG. 6a.

DETAILED DESCRIPTION

Disclosed herein are utilities (e.g., apparatuses, systems, methods, etc.) for facilitating multi-channel azimuth recording (and reading) of tape media to achieve increased storage densities on the tape media. More particularly, a tape head module disclosed herein includes opposite lateral or overwrapped edges over which a tape media travels that may be positioned perpendicular to the tape media motion direction in addition to an array (e.g., set, span) or read and/or write elements (e.g., transducers) that are simultaneously positioned or oriented non-perpendicularly to the tape media motion direction to perform azimuth reading and/or writing (recording) of the tape media. For instance, a contour may be machined into or otherwise formed in the upper surface of a standard or existing tape head module to create new first and second lateral overwrapped edges of the tape head module that are disposed at a particular azimuth angle to the original first and second lateral edges of the tape head module. When placed into a tape drive, the tape head module may be rotated or repositioned (from the position that the tape head module would have been placed before generation of the new lateral edges) and fixed relative to the tape drive such that the new lateral edges are disposed perpendicular to the tape motion direction to automatically position the array of read and/or write elements at the azimuth angle to the tape travel motion. Tape heads with various combinations of read/write element array azimuth angles are envisioned and encompassed herein.

Figure 3:
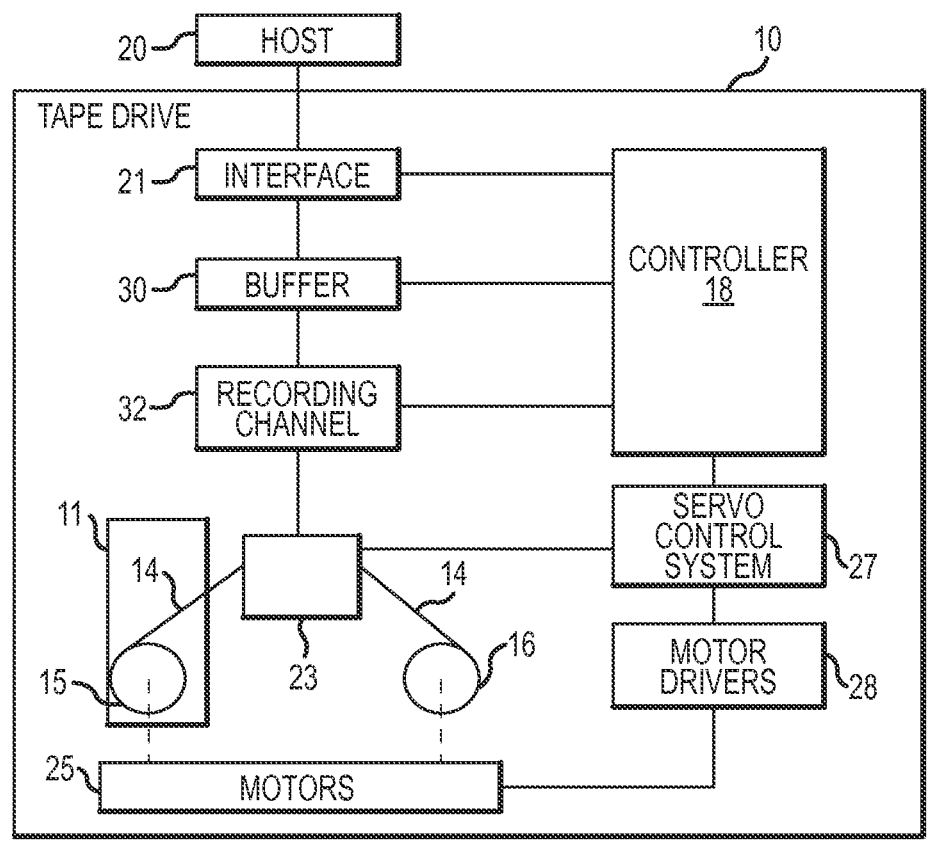
FIG. 3 is a schematic view of an exemplary tape drive that may be adapted to implement the various utilities (e.g., apparatuses, methods, and/or the like) disclosed herein.

Before discussing the disclosed utilities (including the disclosed tape head modules configured to perform azimuth recording (writing) and reading of data of tape media traveling thereover), reference is initially made FIG. 3 which presents a schematic view of an exemplary tape drive 10 and a magnetic tape cartridge 11 that may be adapted to implement the various utilities disclosed herein (although it is to be understood that numerous other forms of tape drives may be used to implement the disclosed utilities, such as single reel tape drives, dual reel cartridges, and the like). The magnetic tape cartridge 11 in FIG. 3 includes a length of magnetic tape 14 (e.g., magnetic tape pack, magnetic tape media) wound on at least one reel 15. The tape drive 10 may include one or more controllers 18 of a recording system for operating the tape drive 10 in accordance with commands received from a host system 20 received at an interface 21. The tape drive 10 may be coupled to the host system 20 in a number of manners such as directly, through a library, or over a network (e.g., via Small Computer Systems Interface (SCSI), Fibre Channel Interface, and the like). The tape drive 10 may be a standalone unit or form part of a tape library or other subsystem.

The magnetic tape cartridge 11 may be inserted into the tape drive 10 and loaded by the tape drive 10 so that the tape 14 winds around a reel 16 of the tape drive 10 and so that at least one tape head assembly 23 of the recording system (e.g., each including one or more tape heads, tape head modules, tape guides, rollers, or the like) reads and/or writes information with respect to the tape 14 as the tape 14 is moved longitudinally in first/forward and/or second/reverse opposed directions past the tape head assembly 23 along a course by one or more motors 25. For instance, each tape head may include one or more tape head modules, where each tape head module includes a plurality of read elements, write elements, and/or servo elements for use in respectively reading data from the tape 14, writing data to the tape 14, and maintaining precise control of the tape head assembly 23 and the tape 14.

The tape 14 may include a plurality of parallel data tracks that may be read and/or written by the at least one tape head of the tape head assembly 23. In some formats, the tracks may be written and/or read in a serpentine, back and forth manner; in a spiral-in manner; and the like. The recording system may include a servo control or tracking system 27 to electronically switch from one tape head to another tape head; to seek and move a tape head laterally relative to the tape 14 (e.g., perpendicular to a direction of movement or course of the tape 14); to position the a tape head at a desired location over the tape 14 and/or one or more tracks of the tape 14; to follow one or more desired tracks; and/or the like. The servo control system 27 may also control the operation of the motors 25 through motor drivers 28 in response to instructions by the one or more controllers 18, where the controllers 18 may provide the data flow and formatting of data to be read from and written to the magnetic tape 14 (e.g., via employing a buffer 30 and a recording channel 32). The various components of the tape drive 10 may be incorporated or otherwise embodied within any appropriate housing (not shown).

Figure 4:
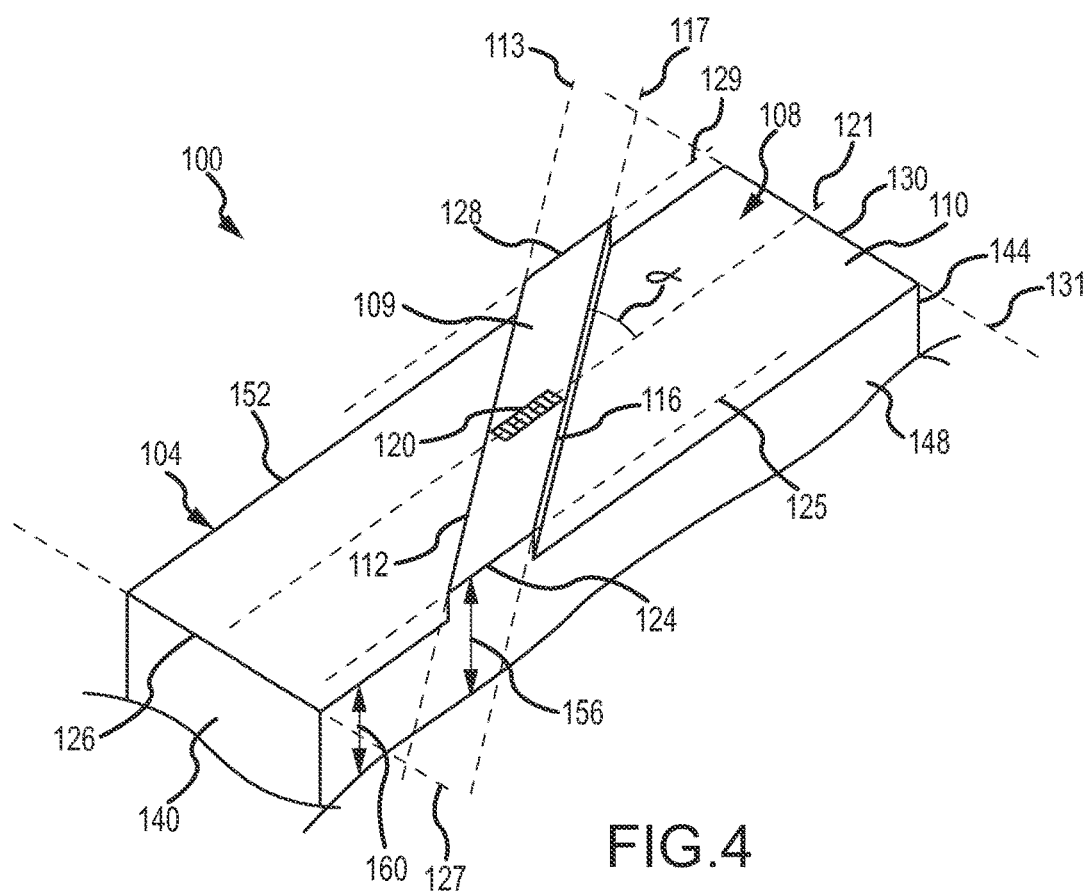
FIG. 4 is a perspective view of a portion of a tape head module that is configured to perform at least one of azimuth writing and reading of data of a magnetic tape.

Turning now to FIG. 4, a perspective view of a portion of a tape head module 100 that is configured to perform at least one of azimuth writing (recording) and reading of data of a magnetic tape is illustrated. The tape head module 100 may be incorporated into a tape head assembly of a tape drive (e.g., tape head assembly 23 of tape drive 10 of FIG. 3) so that magnetic tape (e.g., magnetic tape 14) may be configured to pass thereover in one of first and second opposite directions. Broadly, the tape head module 100 includes a body 104 constructed of any appropriate materials, a top or upper surface 108 on the body 104 having upper (e.g., first) and lower (e.g., second) portions 109, 110 and that is configured to face a magnetic tape (e.g., magnetic tape 200 of FIG. 5a) traveling at least partially over the upper surface 108, and first and second opposite edges 112, 116 (e.g., over which magnetic tape is configured to pass) extending along respective and parallel first and second axes 113, 117 and bordering (e.g., partially encompassing) the upper portion 109 of the upper surface 108.

The upper portion 109 of the upper surface 108 includes a set 120 (e.g., plurality, span) of at least one of read elements and write elements (e.g. transducers) that are respectively configured to read data from and write data to multiple tracks of the magnetic tape as the magnetic tape travels over and at least partially in contact with the upper portion 109. The set 120 of elements (as well as the longitudinal axis of each respective element in the set 120) is disposed along a reference axis 121 that is disposed at a non-parallel and non-perpendicular angle α (e.g., an azimuth) to each of the first and second axes 113, 117. In one arrangement, the angle α may be at least about 5°, such as at least about 10°. In another arrangement, the angle α may be not greater than about 35°, such as not greater than about 30°.

The tape head module 100 may in some embodiments also include third and fourth opposite edges 124, 128 that border or partially encompass the upper portion 109 of the upper surface 108 and that respectively include parallel third and fourth axes 125, 129 that are parallel to the reference axis 121. In another arrangement, the tape head module 100 may include fifth and sixth opposite edges 126, 130 that border or partially encompass the lower portion 110 of the upper surface 108 and that respectively include parallel fifth and sixth axes 127, 131 that are non-parallel to the first, second, third, fourth and reference axes 113, 117, 125, 129.

When the tape head module 100 is disposed in a tape drive with the first and second axes 113, 117 (and thus the opposite edges 112, 116) oriented perpendicularly to the direction of travel of magnetic tape traveling over the upper portion 109 of the upper surface 108, the reference axis 121 (and thus the set 120 of elements) is automatically positioned to write and/or read data on the magnetic tape at the angle α (i.e., azimuthly write and/or read data) relative to the direction of motion of the magnetic tape. As azimuthly-oriented read transducers can thus extend onto adjacent tracks written at opposite azimuths free of incurring any signal to noise degradation (e.g., due to interference created that effectively cancels any corresponding noise), guard bands can be dispensed with and increased track densities can be achieved.

As just one example of how a tape head module 100 may be created, one or more tape head modules may be initially constructed in a traditional manner. Each tape head module may have a body 104, an upper surface 108 with a set of elements 120 disposed along a reference axis 121, and a constant thickness between first and second ends 140, 144 and first and second sides 148, 152 of the tape head module. In a conventional design, the third and fourth edges 124, 128 would extend from the first end 140 to the second end 144 and would be disposed perpendicular to the direction of motion of magnetic tape so that the set of elements 120 can write and/or read data on the magnetic tape in a direction parallel to or otherwise along the direction of motion of the magnetic tape.

However, embodiments disclosed herein include removing material (e.g., via machining or the like) from the upper surface 108 of a traditional tape head module at a non-parallel and non-perpendicular angle relative to the reference axis 121 to form the first and second opposite edges 112, 116. After the removing, the upper surface 108 includes opposite lower portions 110 on opposite sides or ends of the set 120 of elements and the upper portion 109 that includes the set 120 of elements. For instance, the thickness 156 of the body 104 adjacent the upper portion 109 of the upper surface may be greater than a thickness 160 of the body 104 adjacent the lower portions 110 of the upper surface 108. Stated differently, the upper portion 109 may be disposed at a first height on the body 104 than that is greater than a second height of the lower portions 110.

In addition to creating the first and second opposite edges 112, 116 disposed at the angle $\alpha$ to the reference axis 121 of the set 120 of elements, forming the lower portions 110 of the upper surface 108 reduces friction between tape head module 100 and a magnetic tape traveling thereover. More specifically, a magnetic tape traveling perpendicularly to the first and second opposite edges 112, 116 may be in contact with the upper portion 109 so that the set 120 of elements can write and/or read data on the magnetic tape at the angle $\alpha$ relative to the direction of motion of the tape while being free (or at least substantially free) of contact with the lower portions 110 as the lower portions 110 are disposed below the upper portion 109. By reducing the aforementioned friction, increases in control of lateral positioning of the tape head module 100 relative to the tape, tape tension, and tape speed may be achieved. In one arrangement, the first and second opposite edges 112, 116 may be appropriately tapered (e.g., curved, rounded, etc.) in opposite directions away from each other and along the direction of tape motion to allow for more gradual levels of contact between the tape and tape head module as the tape moves onto the tape head module in an effort to maintain a balance between tape head module/tape spacing and contact pressure. Additionally or alternatively, the third and fourth edges 124, 128 may be appropriately tapered (e.g., curved, rounded, etc.) away from each other to avoid or limit damage to the tape and/or difficulties with control of lateral positioning, tape speed, etc. that may otherwise occur in the event of a sharp profile change between the upper and lower portions 109, 110 of the upper surface 108.

One or more of the tape head modules 100 may be appropriately secured (e.g., fixed) to or within a tape head assembly of a tape drive to write and/or read data at positive and/or negative angles $\alpha$ (e.g., positive and/or negative azimuths) relative to a direction of motion of a magnetic tape traveling thereover in numerous manners. With initial reference to FIG. 5a, a close-up, simplified schematic plan view of a tape head assembly 300 performing azimuth writing and/or reading of data of a magnetic tape 200 traveling thereover according to one embodiment is illustrated. The magnetic tape 200 includes first and second opposite, parallel edges 204, 208 and is movable (e.g., via controller 18, servo control system 27, etc. of tape drive 10 of FIG. 3) in one of first and second opposite directions 212, 216 along a path 211 (e.g., direction of motion, etc.) over the tape head assembly 300.

As shown in FIG. 5a, the tape head assembly 300 includes first and second tape head modules $100_1$, $100_2$ (e.g., each the same as the tape head module 100 of FIG. 4) whose first and second axes 113, 117 (and thus first and second opposite edges 112, 116) are perpendicular to the path 211 of the magnetic tape 200 (many components of tape head module $100_2$ have not been labeled in the interest of clarity) and whose reference axes 121 are parallel. Stated differently, the first and second opposite edges 112, 116 of each of the first and second tape head modules $100_1$, $100_2$ may be arranged along or parallel to the width of the tape 200 between the first and second opposite edges 204, 208 such that the reference axis 121 (and thus the set 120 of elements) is disposed at the angle $\alpha$ to the first and second axes 113, 117.

Figure 2:
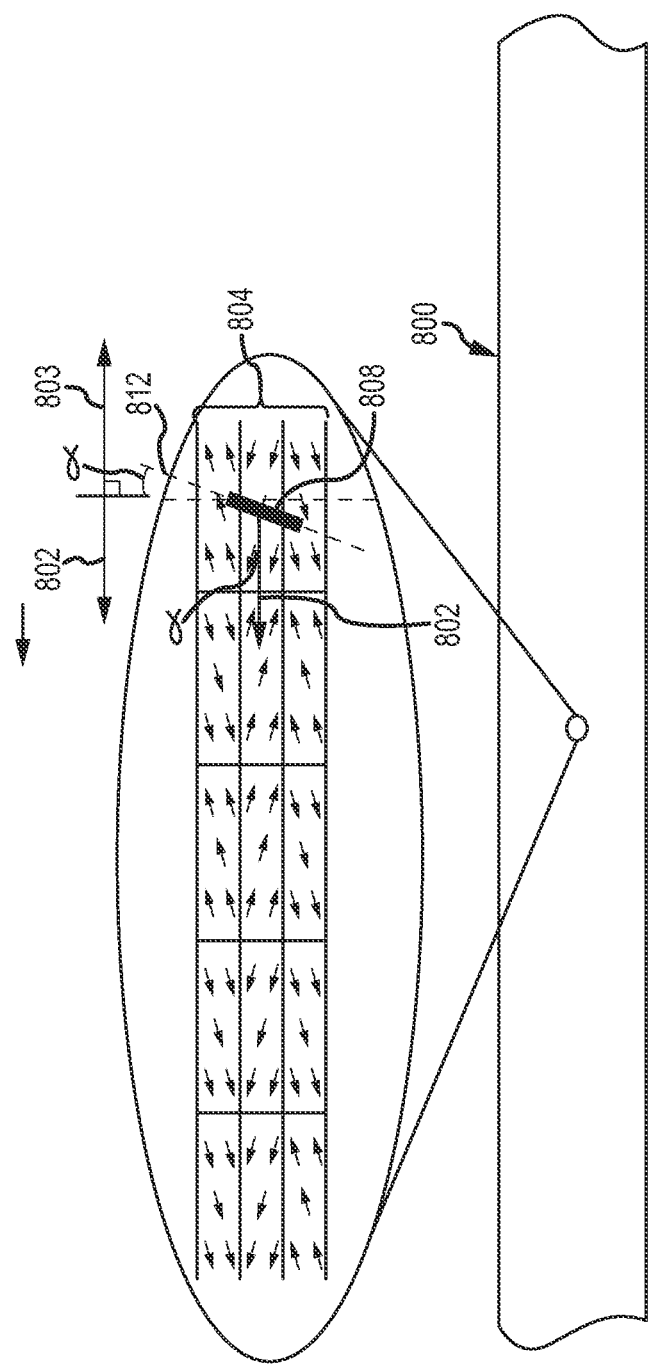
FIG. 2 is close-up, simplified schematic plan view of a read transducer reading data bands from a magnetic tape according to the prior art, where data bands are written at an azimuth angle to one of first and second opposite directions of motion of the tape, where the read transducer is oriented to read the azimuthly-written data.

As a result, each element in the set 120 of elements of each of the first and second tape head modules $100_1$, $100_2$ may be configured to write and/or read data, such as data 220, at a positive angle $\alpha^+$ relative to the path 211 of the magnetic tape 200 (e.g., additional data 220 for additional elements in the set 120 has not been shown in the interest of clarity). While not shown, the data 220 may be disposed within multiple parallel data tracks (e.g., data tracks 804 of FIG. 2), where the data 220 in each data track may be written at the positive angle $\alpha^+$ to the path 211. The first and second tape head modules $100_1$, $100_2$ may be configured to simultaneously and/or independently laterally move (e.g., via the controller 18, servo control system 27, etc. of the tape drive 10 of FIG. 3) along the width of the magnetic tape 200 (e.g., perpendicular to the path 211) to write and/or read data in other tracks on the magnetic tape 200.

As discussed previously, data written at a particular angle $\alpha$ relative to the path 211 typically must be read with a read element (e.g., transducer) that is configured to read data written at the same particular angle $\alpha$. For instance, if data is written at a positive angle $\alpha^+$ of 20° relative to the path 211 (e.g., in a clockwise direction from path 211) by a write transducer, then a read transducer typically must be oriented at the same positive angle $\alpha^+$ of 20° relative to the path 211 (i.e., a longitudinal axis of a read transducer typically must be oriented at the positive angle $\alpha^+$ of 20° in a clockwise direction from a line perpendicular to the path 211). In this regard, the set of elements 120 of the first tape head module $100_1$ may be write elements that are configured to write data 220 at the particular positive angle $\alpha^+$ while the set of elements 120 of the second tape head module $100_2$ may be read elements that are configured to read data 220 at the particular positive angle $\alpha^+$ (e.g., either data 220 written by the first tape head module $100_1$ or by another tape head module of another tape head assembly) with the magnetic tape 200 moving in the second direction 216 along path 211. Alternatively, the set of elements 120 of the second tape head module $100_2$ may be write elements that are configured to write data 220 at the particular positive angle $\alpha^+$ while the set of elements 120 of the first tape head module $100_1$ may be read elements that are configured to read data 220 at the particular positive angle $\alpha^+$ (e.g., either data 220 written by the second tape head module $100_2$ or by another tape head module of another tape head assembly) with the magnetic tape 200 moving in the first direction 212 along path 211.

FIG. 5b presents a close-up, simplified schematic plan view of a tape head assembly 300' performing azimuth writing and/or reading of data of a magnetic tape 200 traveling thereover according to another embodiment. The first and second tape head modules $100_1'$, $100_2'$ of the tape head assembly 300' are similar to the first and second tape head modules $100_1$, $100_2$ of the tape head assembly 300 of FIG. 5a except for that the angle between the reference axis 121' of the set 120' of elements and first and second axes 113', 117' of the first and second opposite edges 112', 116' is a negative angle $\alpha^-$ rather than a positive angle $\alpha^+$. For instance, material may be removed from the upper surface 108 of the first and second tape head modules $100_1'$, $100_2'$ at an angle (a negative angle $\alpha^-$) opposite to the angle (the positive angle $\alpha^+$) at which material was removed to form the first and second tape head modules $100_1$, $100_2$. In one arrangement, the set of elements 120' of the first tape head module $100_1'$ may be write elements that are configured to write data 220' at the particular negative angle $\alpha^-$ (e.g., in a counterclockwise direction relative to the path 211) while the set of elements 120' of the second tape head module $100_2'$ may be read elements that are configured to read data 220' at the particular negative angle $\alpha^-$ (e.g., either data 220' written by the first tape head module $100_1'$ or by another tape head module of another tape head assembly) with the magnetic tape 200 moving in the second direction 216 along path 211. Alternatively, the set of elements 120' of the second tape head module $100_2'$ may be write elements that are configured to write data 220' at the particular negative angle $\alpha^-$ while the set of elements 120' of the first tape head module $100_1'$ may be read elements that are configured to read data 220' at the particular negative angle $\alpha^-$ (e.g., either data 220' written by the second tape head module $100_2'$ or by another tape head module of another tape head assembly) with the magnetic tape 200 moving in the first direction 212 along path 211.

Figure 5C:
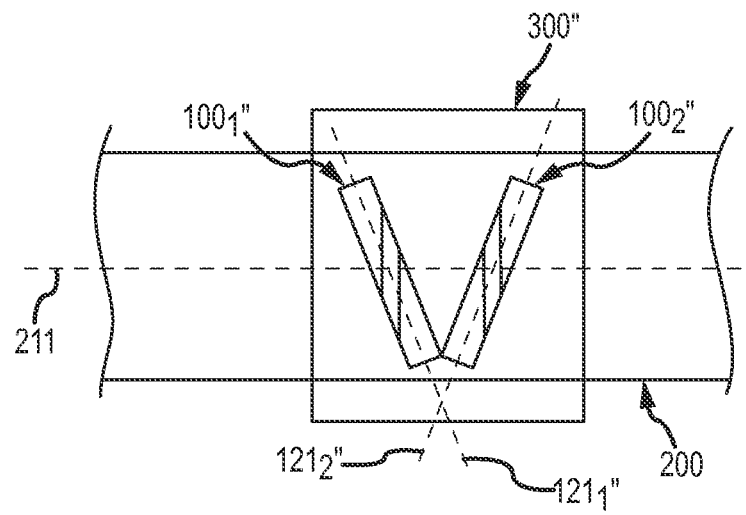
FIG. 5c is a close-up, simplified schematic plan view of a tape head assembly performing azimuth writing and/or reading of data of a magnetic tape traveling thereover, according to another embodiment.

FIG. 5c presents a close-up, simplified schematic plan view of a tape head assembly 300'' performing azimuth writing and/or reading of data of a magnetic tape 200 traveling thereover according to another embodiment. In this embodiment, the first tape head module $100_1''$ may be similar to the first tape head module $100_1'$ of FIG. 5b and thus may be configured to perform writing and reading of data on magnetic tape at a negative angle $\alpha^-$ relative to the path 211. Also in this embodiment, the second tape head module $100_2''$ may be similar to the second tape head module $100_1$ of FIG. 5a and thus may be configured to perform write and reading of data on magnetic tape at a positive angle $\alpha^+$ relative to the path 211. As a result, the reference axes 121'' of the first and second tape head modules $100_1''$, $100_2''$ may be non-parallel (e.g., non-perpendicular). For instance, the first and second tape head modules $100_1''$, $100_2''$ may be configured to respectively and simultaneously read negatively and positively angled data from adjacent tracks. As another example, one of the first and second tape head modules $100_1''$, $100_2''$ may write data at a respective negative or positive angle $\alpha$ while the other of the first and second tape head modules $100_1''$, $100_2''$ may read data at the other of a negative or positive angle $\alpha$.

It is not necessary that all tape head modules 100 in each tape head assembly 300 are simultaneously active as the magnetic tape is moving in one of the first and second directions 212, 216 along the path 211. For instance, one of the tape head modules 100 in a tape head assembly 300 may be performing active writing or reading of data (e.g., azimuth writing or reading) while another of the tape head modules 100 in the tape head assembly may be temporarily inactive. Furthermore, one or more tape head modules 100 of one tape head assembly 300 may be configured to appropriately work in concert with one or more other tape head modules 100 of one or more other tape head assemblies 300. Still further, numerous other arrangements of tape head assemblies 300 including various numbers and arrangements of tape head modules 100 (e.g., including those with more than two tape head modules 100) consistent with the teachings herein are envisioned and encompassed herein.

Figure 1:
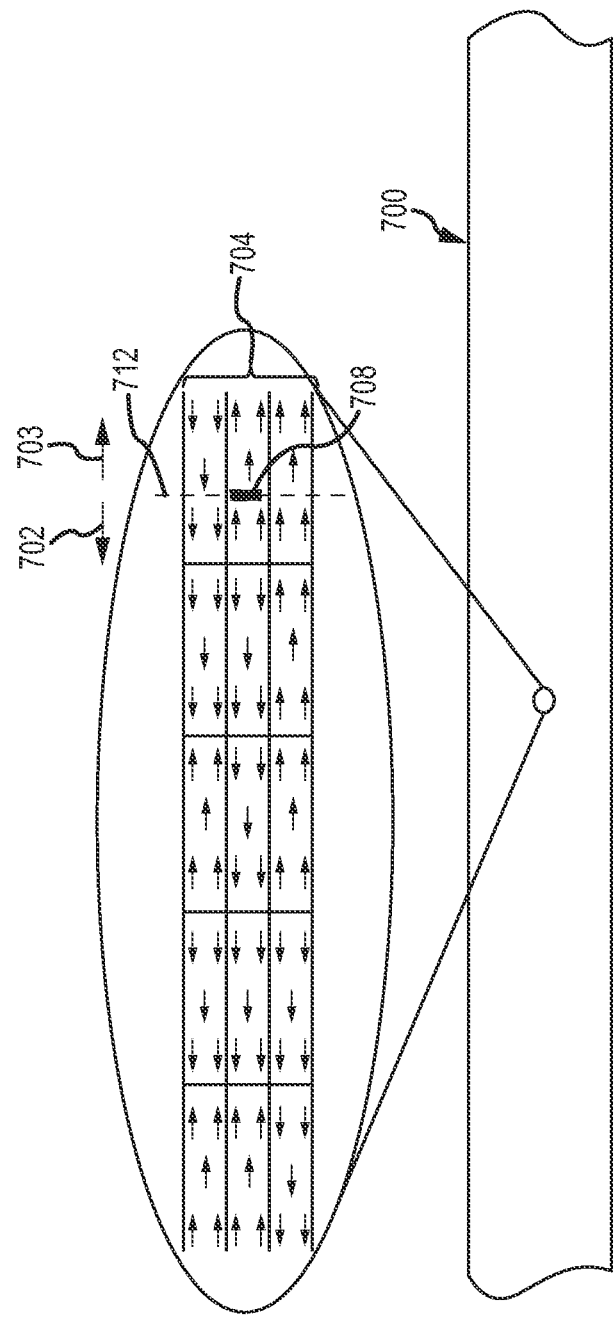
FIG. 1 is a close-up, simplified schematic plan view of a read transducer reading data bands from a magnetic tape according to the prior art, where data bands are written parallel to one of first and second opposite directions of motion of the tape, and where the read transducer is oriented perpendicularly to a direction of motion of the magnetic tape.
Figure 5D:
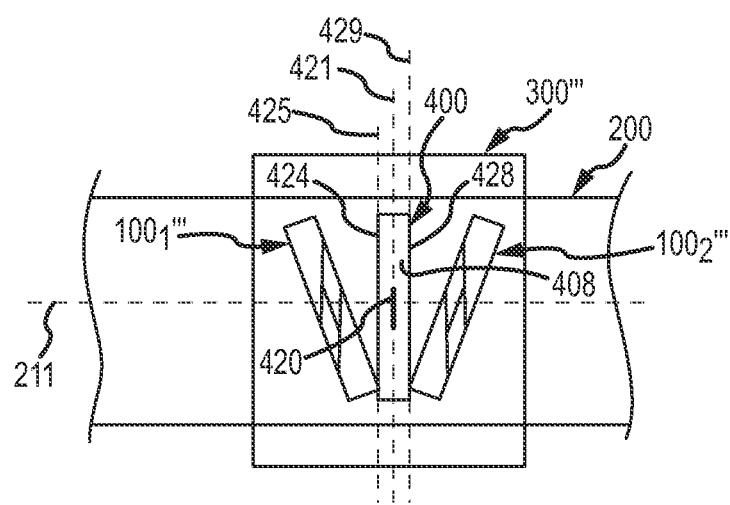
FIG. 5d is a close-up, simplified schematic plan view of a tape head assembly performing azimuth writing and/or reading of data of a magnetic tape traveling thereover, according to another embodiment.

For instance, FIG. 5d presents a close-up, simplified schematic plan view of a tape head assembly 300''' performing azimuth writing and/or reading of data of a magnetic tape 200 traveling thereover according to another embodiment. This embodiment is similar to that illustrated in FIG. 5c except for that a traditional tape head module 400 is disposed between the first and second tape head modules $100_1'''$, $100_2'''$. More specifically, the tape head module 400 includes a body (not labeled) and an upper surface 408 on the body on which a set 420 of elements is disposed along a reference axis 421. First and second opposite edges 424, 428 respectively disposed along first and second parallel axes 425, 429 border or partially encompass the upper surface 408 and the set 420 of elements. As shown, the tape head module 400 may be disposed in the tape head assembly 300''' so that the axes 421, 425, 429 are all perpendicular to the path 211 of the magnetic tape 200. As a result, the set 420 of elements of the tape head module 400 may perform traditional writing and/or reading of data on the magnetic tape 200 in a manner that is parallel to or along the path 211 (e.g., similar to that shown in FIG. 1). The tape head assembly 300''' of FIG. 5d thus may be used to perform azimuth and/or traditional writing and/or reading of data on the magnetic tape 300.

Figure 6A:
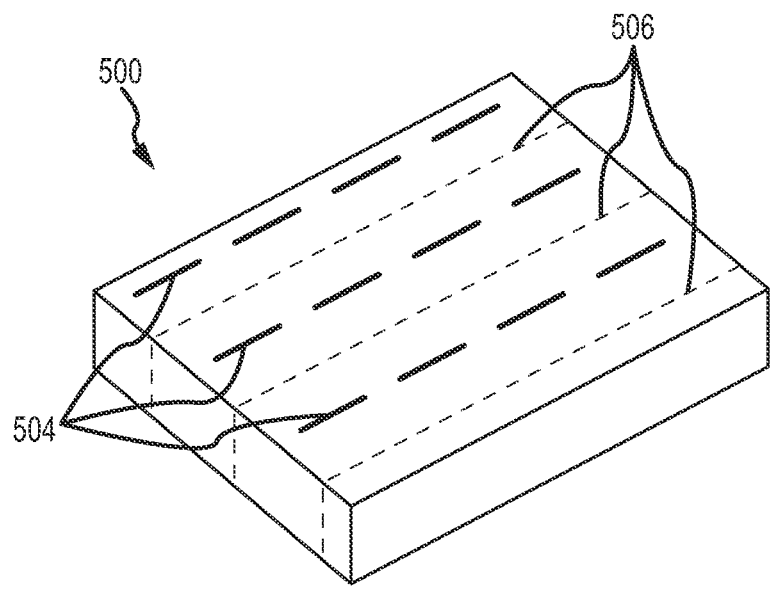
FIG. 6a illustrates a wafer used to construct tape head modules disclosed herein.

One manner of fabricating a plurality of tape head modules (e.g., tape head modules 100 of FIGS. 4-5d) will now be discussed although numerous other manners of manufacturing tape head modules having sets/spans of elements/transducers at azimuth angles to first and second opposite edges of an upper surface are envisioned and encompassed herein. Turning initially to FIG. 6a, a wafer 500 including a ceramic substrate or the like having a plurality of layers (e.g., films, not shown) deposited thereon in a traditional manner may be initially created or otherwise provided (portions 504 of one of the layers are shown exposed on a top surface of the wafer 500 in FIG. 6a). The wafer 500 may then be parted (e.g., sliced, separated, etc.) along spaced, parallel first separation lines 506 to create a plurality of individual chips 508 (e.g., wafer portions, row bars, etc.).

Figure 6B:
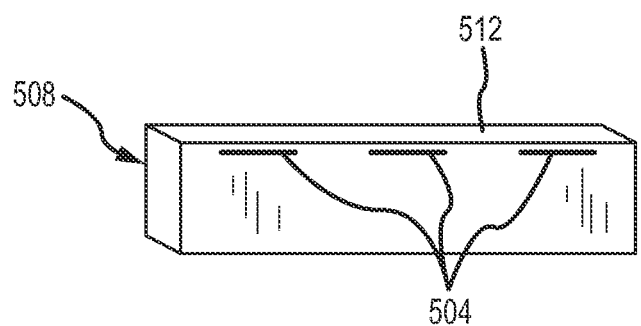
Figure 6C:
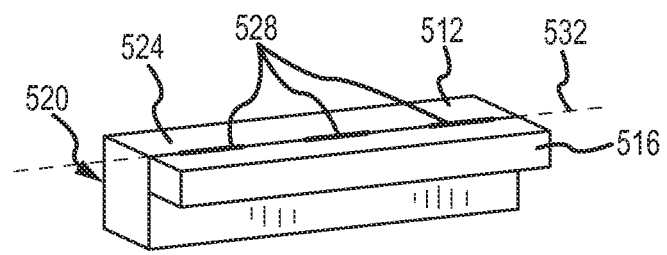
FIG. 6c illustrates the chip of FIG. 6b with a bar of material adhered thereto to create a wafer module, wherein the wafer module has been machined to expose a plurality of arrays of read and/or write elements.

With reference to the chip 508 of FIG. 6b, the chip 508 may be reoriented so that the portions 504 are exposed on a side of the chip 508. Stated differently, a top surface 512 of the chip 508 is made up of the thickness of the wafer 500 of FIG. 6a. A bar 516 of material (e.g., constructed of the same material as the substrate of the wafer 500, such as ceramic) may then be appropriately adhered over the portions 504 of each chip 508 to create a plurality of wafer modules 520. The top surface 524 of each wafer module 520 may then be precisely machined to expose a plurality of arrays 528 of elements (read and/or write elements) on the top surface 524 of the wafer module 520 as shown in FIG. 6c. Each array 528 of elements on each wafer module 520 may include a cross-section of the various layers previously deposited onto the substrate of the wafer 500 and generally extend along a respective reference axis 532. Furthermore, the machining facilitates correct dimensioning of the transducers (e.g., height-wise), provides a smooth surface finish for the contact surface of the tape head module, and the like.

Figure 6D:
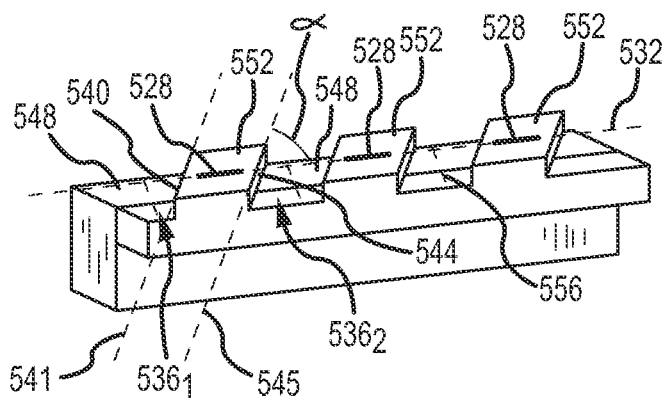
FIG. 6d illustrates the wafer module of FIG. 6c with material removed to create a plurality of channels in the top surface thereof.

As shown in FIG. 6d, material may be removed (e.g., via machining or the like) from the top surface 524 of each wafer module 520 to create a plurality of channels 536 in the top surface 524 that extend between adjacent ones of the arrays 528 of the wafer module 520 and at a non-parallel and non-perpendicular angle $\alpha$ to the reference axis 532 (the depth of the channels 536 has been greatly exaggerated for purposes of this discussion). For instance, creation of first and second $536_1$, $536_2$ of the channels 536 may form first and second opposite edges 540, 544 that respectively extend along parallel first and second axes 541, 545, where the particular angle α (e.g., azimuth) is disposed between the reference axis 532 and the first and second axes 541, 545. Furthermore, a bottom of each channel 536 may be a lower portion 548 of an upper surface of one or more tape head modules to be formed (discussed below) while each portion of the upper surface between adjacent ones of the plurality of channels 536 may be an upper portion 552 of the upper surface. As shown in FIG. 6d, a respective array 528 of elements is disposed on each upper portion 552.

Figure 6E:
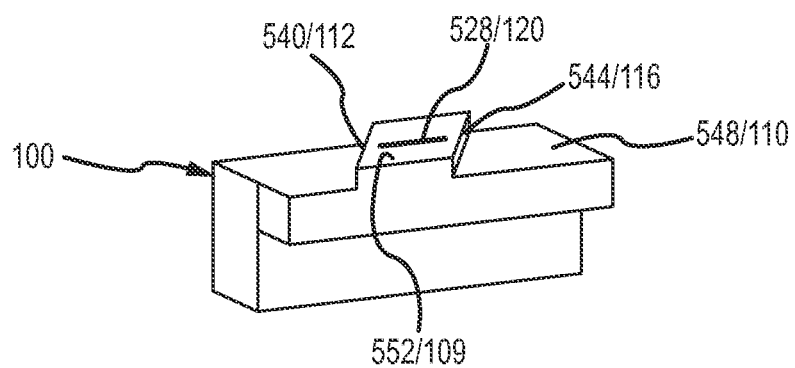
FIG. 6e illustrates a tape head module cut from the wafer module of FIG. 6d.

The method may also include parting (e.g., slicing, separating, etc.) each wafer module 520 along a plurality spaced, parallel second separation lines 556 (see FIG. 6d) between adjacent upper portions 552 and perpendicular to the reference axis 532 to form a plurality of tape head modules 100 (e.g., the same as those in FIGS. 4-5d). See tape head module 100 of FIG. 6e. More particularly, an upper portion 109 of an upper surface 108 of each tape head module 100 may include one of the upper portions 552 while each lower portion 110 of the upper surface 108 of each tape head module 100 may include a portion of one of the lower portions 548. Furthermore, a set 120 of elements on the upper portion 109 of each tape head module 100 may include one of the arrays 528 of elements of the wafer module 520. A similar method may be employed to generate tape head modules having positive azimuths (e.g., tape head modules 100 of FIGS. 4 and 5a) and negative azimuths (e.g., tape head modules 100' of FIG. 5b), where the particular azimuth would be dictated by the angle α at which the channels 536 are formed relative to the arrays 528 of elements.

As discussed previously, tape head modules 100 with positive and/or negative azimuths may be incorporated into a tape drive (e.g., tape drive 10 of FIG. 3) in various manners (e.g., such as, but not limited to, the tape head assembly schematic views of FIGS. 5a-5d) for purposes of performing azimuth recording and reading of magnetic tape. For reference, one specific manner of constructing a system (e.g., tape head, tape head assembly, etc.) that includes one or more tape head modules 100 positioned to perform azimuth recording and/or reading of data on a magnetic tape will now be described although it is to be understood that the tape head modules 100 disclosed herein may be appropriately incorporated into numerous other systems and assemblies.

Figure 7A:
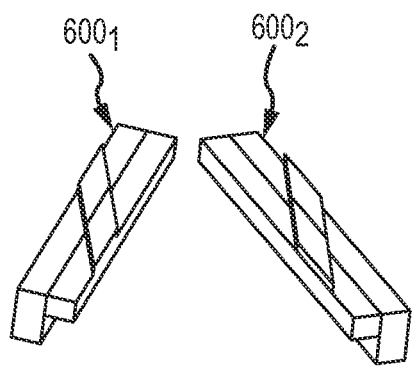
FIG. 7a illustrates first and second tape head modules used to construct a system for performing azimuth reading and/or writing of data on a magnetic tape.
Figure 7B:
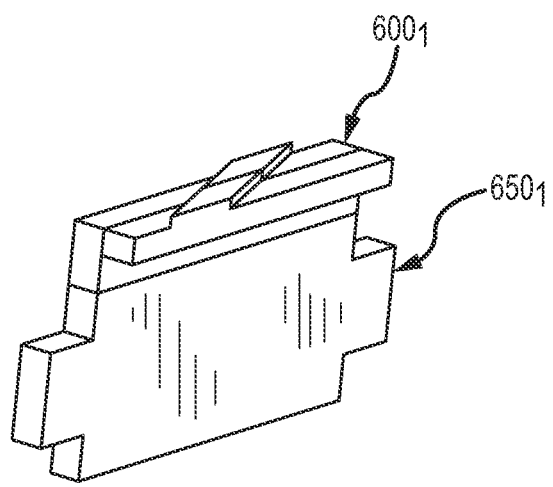
FIG. 7b illustrates the first tape head module of FIG. 7a being outfitted with an attachment block.
Figure 7C:
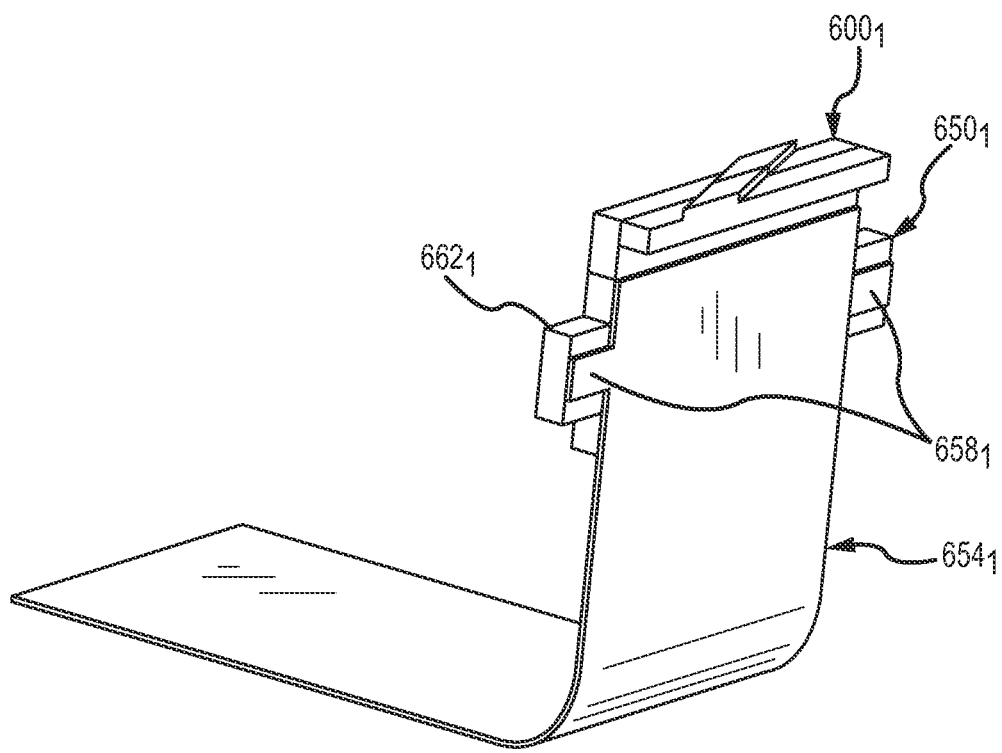
FIG. 7c illustrates the first tape head module of FIG. 7b with a flexible printed circuit connector being secured to the attachment block.
Figure 7D:
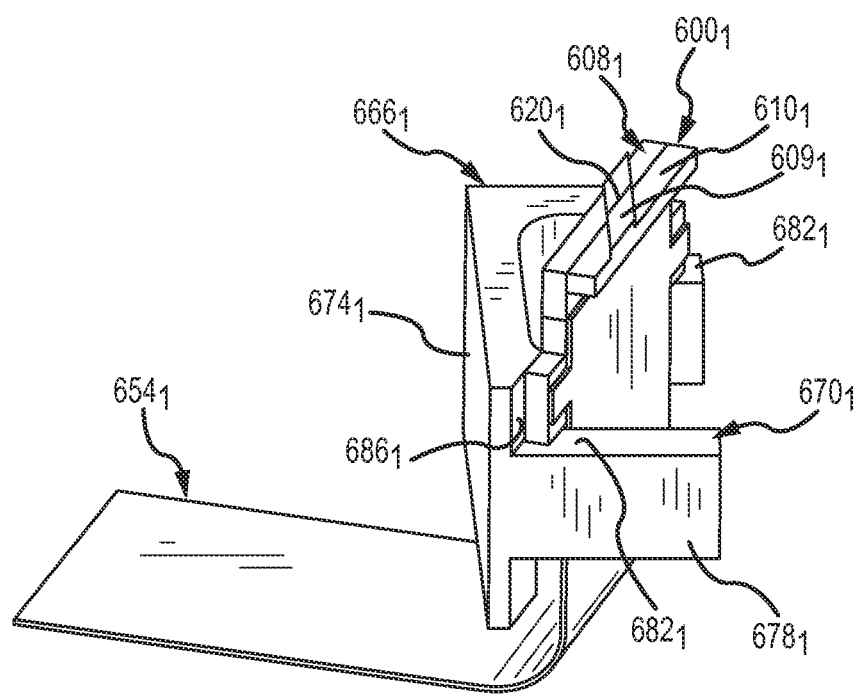
FIG. 7d illustrates the first tape head module of FIG. 7c being secured to a carrier member.
Figure 7E:
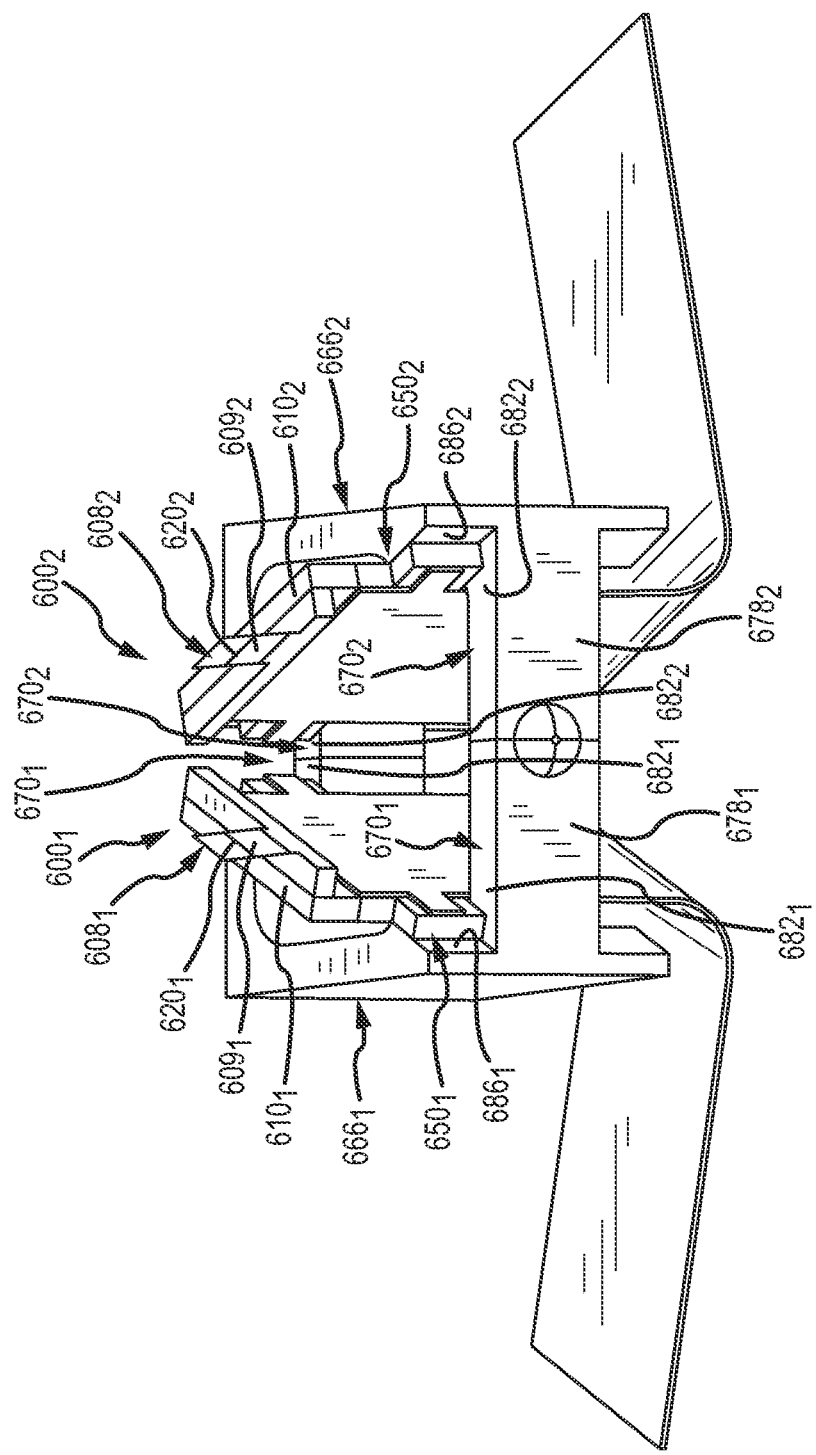
FIG. 7e illustrates the first and second tape head modules FIGS. 7a-7d being secured to respective first and second carrier members of a frame.

With initial reference to FIG. 7a, at least first and second tape head modules $600_1$, $600_2$ may be generated according to the above fabrication process and/or in any other appropriate manner(s). For instance, the first tape head module $600_1$ may be a positive azimuth tape head module (e.g., tape head module 100 of FIG. 4, tape head module $100_1$ of FIG. 5a) while the second tape head module $600_2$ may be a negative azimuth tape head module (e.g., tape head module $100_2$' of FIG. 5b). As shown in FIGS. 7b-7c, each of the first and second tape head modules $600_1$, $600_2$ (e.g., their respective sets of elements) may be appropriately outfitted with a flexible printed circuit (FPC) connector or the like to facilitate electrical connection (e.g., for power, communications, etc.) between the tape head module and a tape drive into which the system is to be implemented. For instance, a first attachment block $650_1$ (to which a first FPC connector $654_1$ may be appropriately secured) may be appropriately secured or otherwise fixed adjacent a bottom of the first tape head module $600_1$. In one arrangement, the first FPC connector $654_1$ may include one or more tabs $658_1$ disposed over one or more tabs $662_1$ of the first attachment block $650_1$ to facilitate servo (e.g., discrete) wire routing and/or the like. While not shown in FIGS. 7b-7c, a separate attachment block and FPC connector may be appropriately secured and electrically connected to the second tape head module $600_2$.

Each of the first and second tape head modules $600_1$, $600_2$ (and their corresponding attachment blocks and FPC connectors) may then be appropriately secured to a carrier (e.g., frame) that may be positioned into a tape drive to allow the first and second tape head modules $600_1$, $600_2$ to perform azimuth writing and/or reading of data on a magnetic tape traveling over the tape head modules $600_1$, $600_2$. For instance, and turning now to FIGS. 7d-7g, the first and second tape head modules $600_1$, $600_2$ may be respectively secured to first and second carrier members $666_1$, $666_2$ (e.g., frames, brackets, etc.) for purposes of establishing azimuth positioning (e.g., at least gross azimuth positioning) of their respective sets of elements relative to a direction of motion of a magnetic tape traveling thereover.

More specifically, each of the first and second carrier members $666_1$, $666_2$ may include first and second arrangements $670_1$, $670_2$ of mounting surfaces configured to respectively receive the first and second tape head modules $600_1$, $600_2$ (and their corresponding attachment blocks and FPC connectors) and automatically orient their first and second opposite edges $612_1$, $616_1$ and $612_2$, $616_2$ (e.g., 112, 116 of FIGS. 4-5d) and their respective first and second axes $613_1$, $613_1$ and $617_2$, $617_2$ parallel to side surfaces $674_1$, $674_2$ of the first and second carrier members $666_1$, $666_2$ and perpendicular to end surfaces $678_1$, $678_2$ of the first and second carrier members $666_1$, $666_2$. For instance, the first and second attachment blocks $650_1$, $650_2$ may be secured to the first and second arrangements $670_1$, $670_2$ of mounting surfaces via adhesives or the like. When the first and second carrier members $666_1$, $666_2$ are disposed in a tape drive with their side surfaces $674_1$, $674_2$ disposed perpendicular to the path 211 of a magnetic tape 200 and their end surfaces $678_1$, $678_2$ disposed parallel to the path 211, the first and second sets $620_1$, $620_2$ of elements are thus automatically positioned to write and/or read data on magnetic tape 200 at positive and negative angles $\alpha^+$, $\alpha^-$ (azimuths), respectively.

For instance, the first and second arrangements $670_1$, $670_2$ of mounting surfaces may include one or more first and second base surfaces $682_1$, $682_2$ configured to receive and support a bottom of the first and second attachment blocks $650_1$, $650_2$. The first and second arrangements $670_1$, $670_2$ of mounting surfaces may also include one or more angled (e.g., "azimuth") surfaces $686_1$, $686_2$ against which side surfaces of the first and second attachment blocks $650_1$, $650_2$ are configured to be disposed to automatically position the first and second axes $613_1$, $613_1$ and $617_2$, $617_2$ (and thus the first and second opposite edges $612_1$, $616_1$ and $612_2$, $616_2$) perpendicular to the path 211 of the magnetic tape 200 and thus the first and second sets $620_1$, $620_2$ of elements to write and/or read at respective positive and negative angles $\alpha^+$, $\alpha^-$ (azimuths), respectively. For example, the angled surface(s) $686_1$ of the first carrier member $666_1$ may be disposed along a plane (not shown) that is positioned at the positive angle $\alpha^+$ from a first adjacent side surface $674_1$ of the first carrier member $666_1$. Similarly, the angled surface(s) $686_2$ of the second carrier member $666_2$ may be disposed along a plane (not shown) that is positioned at the negative angle $\alpha^-$ from a second adjacent side surface $674_2$ of the first carrier member $666_1$.

Figure 7F:
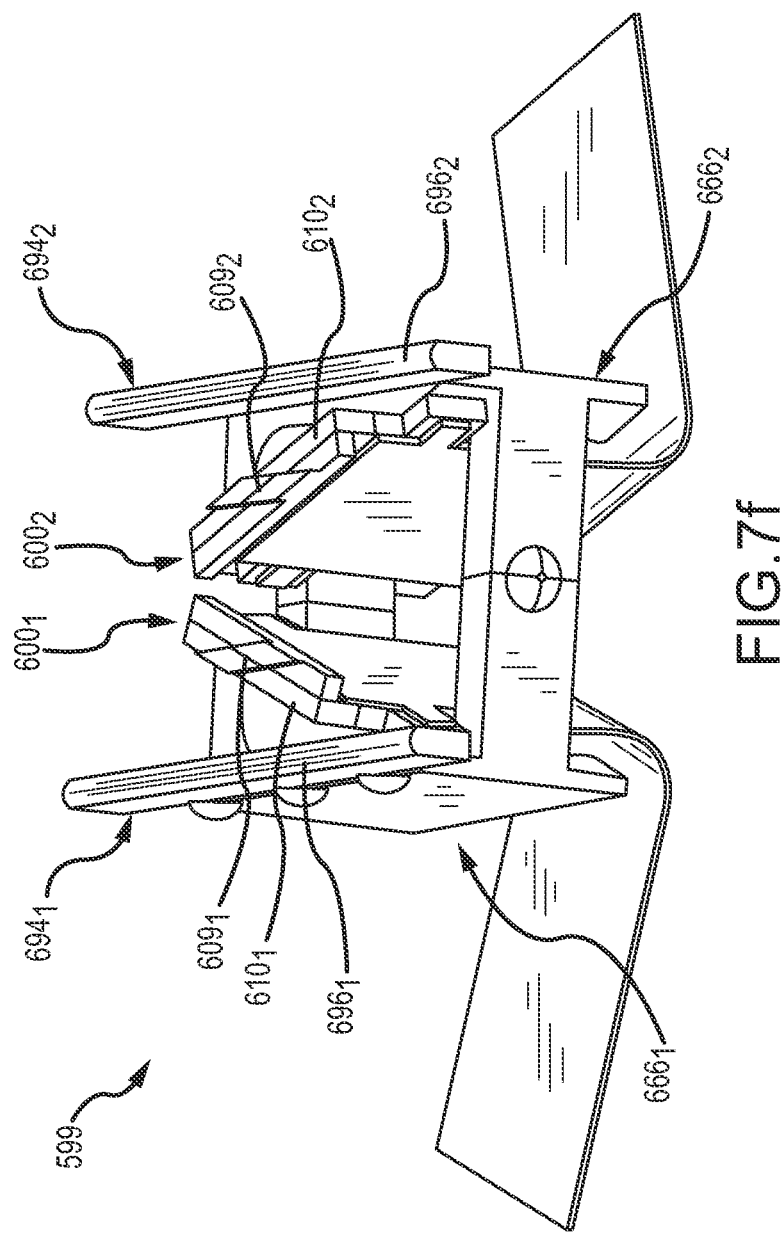
FIG. 7f illustrates the first and second tape head modules FIGS. 7a-7d being secured to the respective first and second carrier members of the frame and including first and second outrigger members being secured to the frame.
Figure 7G:
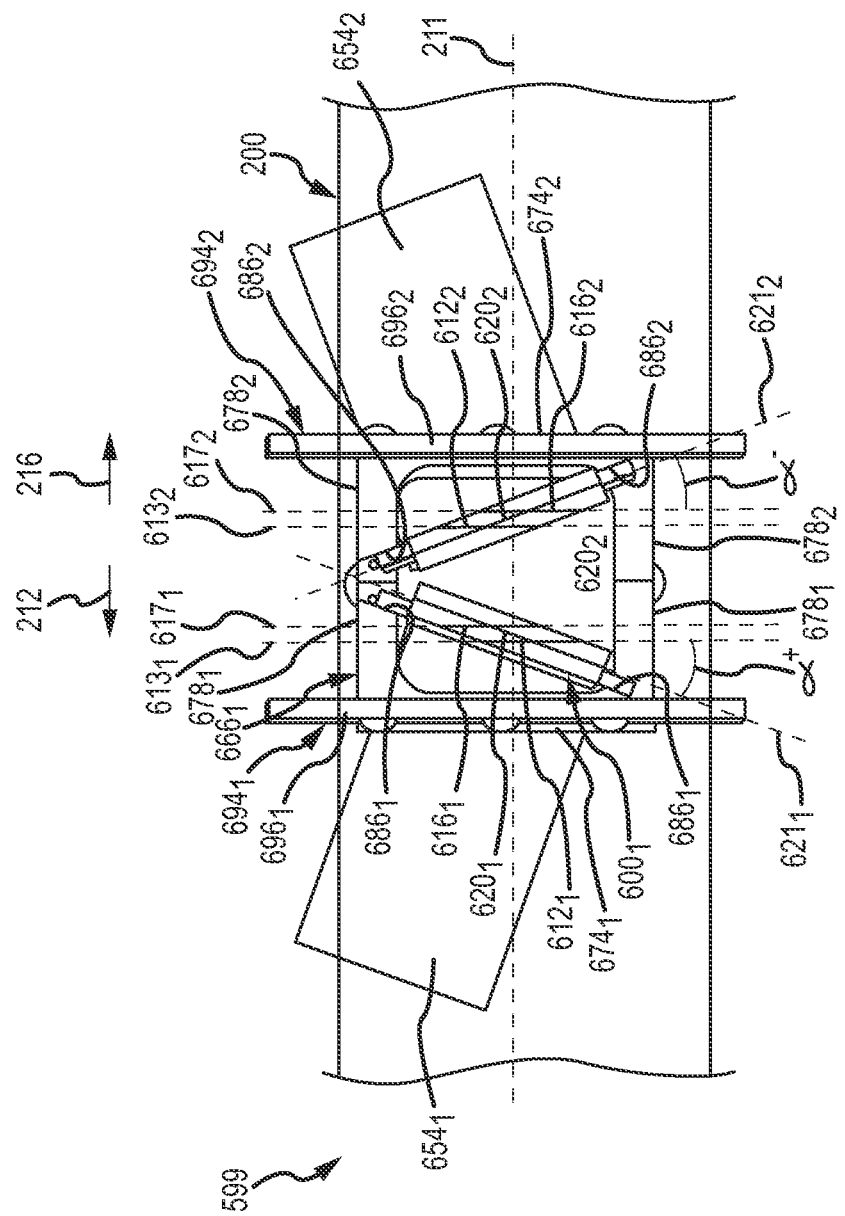
FIG. 7g is a plan view of the illustration of FIG. 7f.
Figure 8:
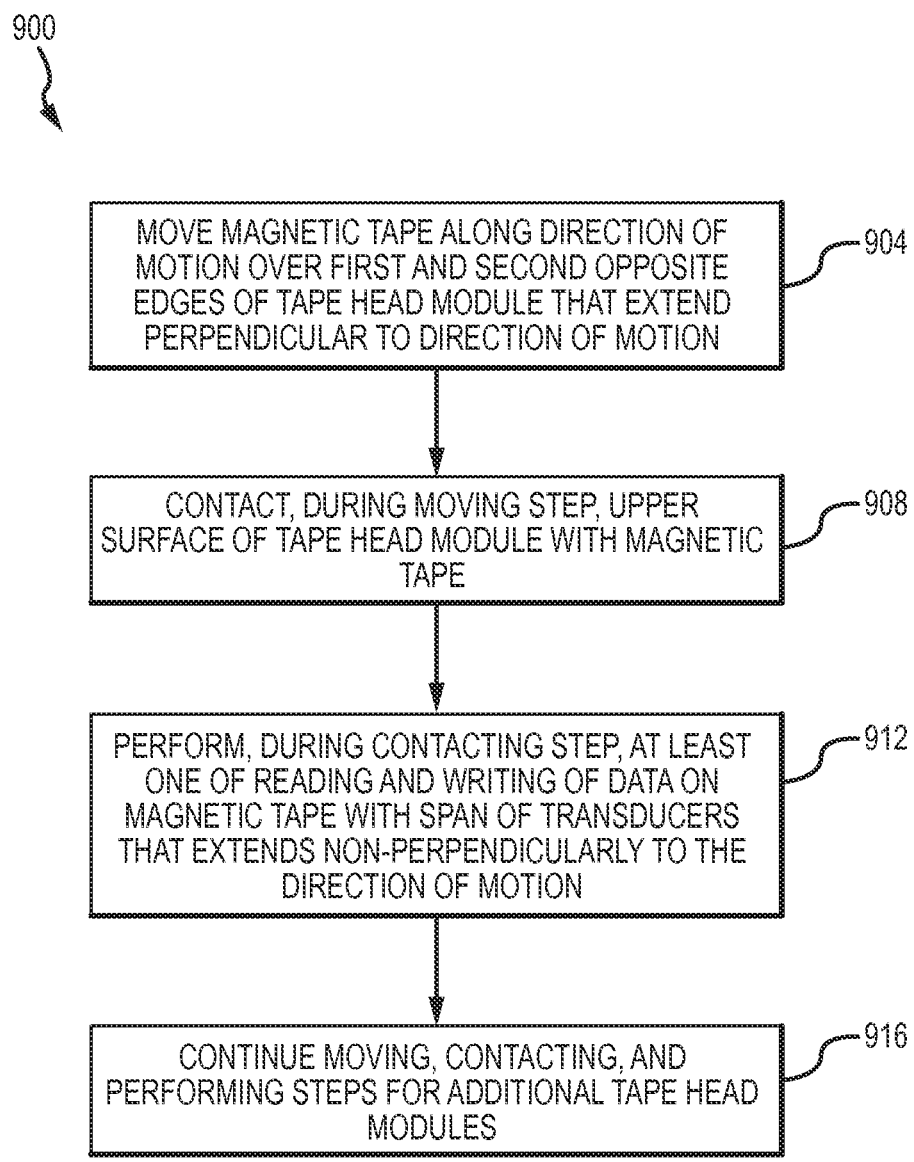
FIG. 8 is a flow diagram of a method of operating a tape drive including tape head modules disclosed herein.

FIGS. 7f-7g illustrate a system 599 formed by the first and second carrier members $666_1$, $666_2$ that may be incorporated into a tape drive for use in performing azimuth writing and reading of a magnetic tape 200. The system 599 may be implemented so that side surfaces $674_1$, $674_2$ of the first and second carrier members $666_1$, $666_2$ are disposed perpendicular to the path 211 of the magnetic tape 200. In one arrangement, the first and second carrier members $666_1$, $666_2$ may be fixed or otherwise secured to each other (e.g., via connection members 690) so that the first and second carrier members $666_1$, $666_2$ form a single, integral unit before the system is disposed into a tape drive. In another arrangement, each of the first and second carrier members $666_1$, $666_2$ may be independently disposed within a tape drive.

In a further arrangement, first and second "outrigger" members $694_1$, $694_2$ may be respectively secured to the first and second carrier members $666_1$, $666_2$ for supporting portions of the magnetic tape 200 not in contact with the upper portions $609_1$, $609_2$ of the upper surfaces $608_1$, $608_2$ (labeled in FIG. 7f) of the first and second tape head modules $600_1$, $600_2$. With reference to FIGS. 7f-7g, it can be seen how the width of the magnetic tape 200 may in some situations be greater than the length of the upper portions $609_1$, $609_2$ of the upper surfaces $608_1$, $608_2$. In this regard, the outrigger members $694_1$, $694_2$ may be configured to support the magnetic tape 200 and allow it to pass over and contact the upper portions $609_1$, $609_2$ (e.g., adjacent the sets $620_1$, $620_2$ of elements) while preventing or at least reducing the likelihood of contact between a) the magnetic tape 200 and b) the lower portions $610_1$, $610_2$ of the upper surfaces $608_1$, $608_2$, the first and second carrier members $666_1$, $666_2$, and the like. For instance, upper surfaces $696_1$, $696_2$ of the first and second "outrigger" members $694_1$, $694_2$ may include curved profiles along the path 211 across their entire lengths (across the width of the magnetic tape 200) to limit contact (and thus friction) with the magnetic tape 200.

One of the first and second sets $620_1$, $620_2$ of elements of the first and second tape head modules $600_1$, $600_2$ may be configured to write data to the magnetic tape 200 (e.g., at one of the positive and negative angles $\alpha^+$, $\alpha^-$) while the other of the first and second sets $620_1$, $620_2$ of elements may be configured to read data from the magnetic tape 200 (e.g., at the other of the positive and negative angles $\alpha^+$, $\alpha^-$). While the system 599 discussed in relation to FIGS. 7a-7g includes first and second tape head modules $600_1$, $600_2$ disposed to write/read data on the magnetic tape 200 at the respective positive and negative angles (e.g., azimuths) $\alpha^+$, $\alpha^-$, the first and second carrier members $600_1$, $600_2$ may be appropriately configured to receive and automatically position tape head modules to perform other types of azimuth writing/reading (e.g., such as, but not including, the arrangements of FIGS. 5a-5d). Still further, systems may be built that include more than two tape head modules.

One method 900 of operating a tape drive (e.g., tape drive 10 of FIG. 3) including tape head modules disclosed herein will now be described although it is to be understood that other methods including the disclosed tape head modules are also envisioned and encompassed herein. At 904, the method may include moving tape moving tape along a direction of motion over first and second opposite edges of a tape head module of a tape drive, where the first and second opposite edges extend perpendicular to the direction of motion. With reference to FIG. 5a, for instance, the magnetic tape 200 may be moved in the second direction 216 along the path 211 over the first and second opposite edges 112, 116 of the first tape head module $100_1$. The method 900 may then include contacting 908, during the moving 904, an upper surface of the tape head module with the tape, where the upper surface is disposed between the first and second opposite edges; and performing 912, during the contacting 908, at least one of reading and writing of data on the tape with a span of transducers disposed on the upper surface, where the span of transducers extends non-perpendicular to the direction of motion.

Again with reference to FIG. 5a for example, the magnetic tape 200 may contact the upper portion 109 of the upper surface 108 as well as the set of elements 120 and then writing or reading operations may be performed on the magnetic tape 200 with the set of elements 120. The moving 904, contacting 908 and performing 912 steps may be continued 916 in relation to other tape head modules as well (e.g., in relation to tape head module $100_2$ of FIG. 5a or even additional tape head modules disclosed herein). The sets 120 of elements (e.g., transducers) of the various tape head modules may form common non-perpendicular angles with the direction of motion (e.g., path 211) of the magnetic tape (e.g., as in FIGS. 5a-5b) or different non-perpendicular angles with the direction of motion (e.g., as in FIGS. 5c, 5d and 7g). The sets 120 of elements may also be non-parallel to the direction of motion.

It will be readily appreciated that many additions and/or deviations may be made from the specific embodiments disclosed in the specification without departing from the spirit and scope of the invention and that the illustrations and discussion herein has only been provided to assist the reader in understanding the various aspects of the present disclosure. For instance, numerous additional components of the tape drive, tape head modules, etc. disclosed herein have been omitted from the drawings and this discussion in the interest of clarity. Furthermore, one or more various combinations of the above discussed arrangements and embodiments are also envisioned.

Embodiments disclosed herein can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a non-volatile memory device, a composition of matter affecting a machine-readable propagated signal, or a combination of one or more of them. In this regard, the host 20, tape drive 10, and the like may encompass one or more apparatuses, devices, and machines for processing data, including by way of example a programmable processor, a computer, or multiple processors or computers. In addition to hardware, the host 20, tape drive 10, and the like may include code that creates an execution environment for the computer program in question, e.g., code that constitutes processor firmware, a protocol stack, a database management system, an operating system, or a combination of one or more of them.

While this specification contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The above described embodiments including the preferred embodiment and the best mode of the invention known to the inventor at the time of filing are given by illustrative examples only.

I claim:

1. An apparatus for performing at least one of reading operations and writing operations on a magnetic tape, comprising:
    a body;
    an upper surface on the body that is configured to face a magnetic tape traveling at least partially over the upper surface, wherein the upper surface includes a plurality of transducers configured to read data from or write data to the magnetic tape as the magnetic tape travels over and at least partially in contact with the upper surface, wherein the plurality transducers extends along a reference axis, wherein the upper surface includes a first portion at a first height on the body, wherein the plurality of transducers is included in the first portion of the upper surface, and wherein the upper surface includes a second portion at a second height on the body that is different than the first height; and
    first and second opposite edges that border the upper surface over which the magnetic tape is configured to pass, wherein the first and second opposite edges respectively extend along first and second axes, wherein the first axis is parallel to the second axis, wherein the first axis is non-parallel and non-perpendicular to the reference axis, and wherein the second axis is non-parallel and non-perpendicular to the reference axis.

2. The apparatus of claim 1, further comprising:
    third and fourth opposite edges that border the upper surface over which the magnetic tape is configured to pass, wherein the third and fourth opposite edges respectively extend along third and fourth axes, wherein the third axis is parallel to the fourth axis, and wherein the third and fourth axes are parallel to the reference axis.

3. The apparatus of claim 2, wherein the first, second, third and fourth edges border the first portion of the upper surface.

4. The apparatus of claim 2, further comprising:
    fifth and sixth opposite edges that border the upper surface over which the magnetic tape is configured to pass, wherein the fifth and sixth opposite edges respectively extend along fifth and sixth axes, wherein the fifth axis is parallel to the sixth axis, and wherein the fifth and sixth axes are non-parallel to the first, second, third, fourth and reference axes.

5. The apparatus of claim 4, wherein the fifth and sixth edges border the second portion of the upper surface.

6. The apparatus of claim 5, wherein the first, second, third and fourth edges border the first portion of the upper surface.

7. A system, comprising:
    a frame;
    a first apparatus of claim 1 secured relative to the frame; and
    a second apparatus of claim 1 secured relative to the frame.

8. The system of claim 7, wherein the reference axis of the first apparatus is parallel to the reference axis of the second apparatus.

9. The system of claim 7, wherein the reference axis of the first apparatus is non-parallel to the reference axis of the second apparatus.

10. The system of claim 9, wherein the reference axis of the first apparatus is non-perpendicular to the reference axis of the second apparatus.

11. A method of operating a tape drive, comprising:
    moving tape along a direction of motion over first and second opposite edges of a tape head module of a tape drive, wherein the first and second opposite edges extend perpendicular to the direction of motion;
    contacting, during the moving step, a first portion of an upper surface of the tape head module with the tape, wherein the upper surface is disposed between the first and second opposite edges;
    performing, during the contacting step, at least one of reading and writing of data on the tape with a span of transducers disposed on the first portion of the upper surface, wherein the span of transducers extends non-perpendicular to the direction of motion; and
    limiting, during the moving step, contact between a second portion of the upper surface of the tape head module and the tape, wherein the second portion is disposed below the first portion.

12. The method of claim 11, wherein the tape head module is a first tape head module, and wherein the method further comprises:
    moving the tape along the direction of motion over first and second opposite edges of a second tape head module of the tape drive, wherein the first and second opposite edges of the second tape head module extend perpendicular to the direction of motion;
    contacting, during the step of moving the tape over the first and second opposite edges of the second tape head module, the upper surface of the second tape head module with the tape, wherein the upper surface of the second tape head module is disposed between the first and second opposite edges of the second tape head module; and
    performing, during the step of contacting the upper surface of the second tape head module with the tape, at least one of reading and writing of data on the tape with a span of transducers disposed on the upper surface of the second tape head module, wherein the span of transducers extends non-perpendicular to the direction of motion.

13. The method of claim 12, wherein a non-perpendicular angle is disposed between the span of transducers of the first tape head module and the direction of motion, and wherein the non-perpendicular angle is disposed between the span of transducers of the second tape head module and the direction of motion.

14. The method of claim 12, wherein a first non-perpendicular angle is disposed between the span of transducers of the first tape head module and the direction of motion, wherein a second non-perpendicular angle is disposed between the span of transducers of the second tape head module and the direction of motion, and wherein the first and second non-perpendicular angles are different.

15. The method of claim 12, further comprising:
    moving the tape along the direction of motion over first and second opposite edges of a third tape head module of the tape drive, wherein the first and second opposite edges of the third tape head module extend perpendicular to the direction of motion;
    contacting, during the step of moving the tape over the first and second opposite edges of the third tape head module, the upper surface of the third tape head module with the tape, wherein the upper surface of the third tape head module is disposed between the first and second opposite edges of the third tape head module; and performing, during the step of contacting the upper surface of the third tape head module with the tape, at least one of reading and writing of data on the tape with a span of transducers disposed on the upper surface of the third tape head module, wherein the span of transducers extends perpendicular to the direction of motion.

16. The method of claim 12, wherein the span of transducers extends non-parallel to the direction of motion.

17. The method of claim 11, wherein the moving includes moving the tape along the direction of motion over third and fourth opposite edges of the tape head module that extend non-parallel and non-perpendicular to the direction of motion and that border the first portion of the upper surface.

18. The method of claim 17, wherein the moving includes moving the tape along the direction of motion over fifth and sixth opposite edges of the tape head module that extend non-parallel and non-perpendicular to the direction of motion and that border the second portion of the upper surface.

19. An apparatus for performing at least one of reading operations and writing operations on a magnetic tape, comprising:
   a body;
   an upper surface on the body that is configured to face a magnetic tape traveling at least partially over the upper surface, wherein the upper surface includes a plurality of transducers configured to read data from or write data to the magnetic tape as the magnetic tape travels over and at least partially in contact with the upper surface, and wherein the plurality of transducers extends along a reference axis;
   first and second opposite edges that border the upper surface over which the magnetic tape is configured to pass, wherein the first and second opposite edges respectively extend along first and second axes, wherein the first axis is parallel to the second axis, wherein the first axis is non-parallel and non-perpendicular to the reference axis, and wherein the second axis is non-parallel and non-perpendicular to the reference axis;
   third and fourth opposite edges that border the upper surface over which the magnetic tape is configured to pass, wherein the third and fourth opposite edges respectively extend along third and fourth axes, wherein the third axis is parallel to the fourth axis, and wherein the third and fourth axes are parallel to the reference axis; and
   fifth and sixth opposite edges that border the upper surface over which the magnetic tape is configured to pass, wherein the fifth and sixth opposite edges respectively extend along fifth and sixth axes, wherein the fifth axis is parallel to the sixth axis, and wherein the fifth and sixth axes are perpendicular to the reference axis.

20. A system, comprising:
   a frame;
   a first apparatus of claim 19 secured relative to the frame; and
   a second apparatus of claim 19 secured relative to the frame.

* * * * *

UNITED STATES PATENT AND TRADEMARK OFFICE
CERTIFICATE OF CORRECTION

PATENT NO. : 9,653,098 B2  
APPLICATION NO. : 14/157014  
DATED : May 16, 2017  
INVENTOR(S) : Torline Page 1 of 1

It is certified that error appears in the above-identified patent and that said Letters Patent is hereby corrected as shown below:

In the Specification

In Column 4, Line 36, delete "non parallel" and insert -- non-parallel --, therefor.

In Column 7, Line 51, delete "the a" and insert -- the --, therefor.

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*